(12) United States Patent
Suizo et al.

(10) Patent No.: US 9,166,884 B2
(45) Date of Patent: Oct. 20, 2015

(54) NETWORK LOCATION SERVICE

(75) Inventors: Nick G. Suizo, San Jose, CA (US); Wolfgang Lochner, Sunnyvale, CA (US); Anil Villait, Saratoga, CA (US); Raj Nagarajan, Newark, CA (US)

(73) Assignee: EXTREME NETWORKS, INC., San Jose, CA (US)

( * ) Notice: Subject to any disclaimer, the term of this patent is extended or adjusted under 35 U.S.C. 154(b) by 146 days.

(21) Appl. No.: 11/932,780

(22) Filed: Oct. 31, 2007

(65) Prior Publication Data

US 2009/0113043 A1 Apr. 30, 2009

(51) Int. Cl.
| | |
|---|---|
| G06F 15/173 | (2006.01) |
| H04M 11/04 | (2006.01) |
| H04L 12/24 | (2006.01) |
| H04L 29/08 | (2006.01) |
| H04L 12/26 | (2006.01) |

(52) U.S. Cl.
CPC ............ *H04L 41/12* (2013.01); *H04L 41/08* (2013.01); *H04L 67/18* (2013.01); *H04L 67/24* (2013.01); *H04L 43/0811* (2013.01); *Y02B 60/43* (2013.01)

(58) Field of Classification Search
CPC ........ H04L 67/18; H04W 4/02; H04W 4/023; H04W 4/22; H04W 64/00; H04W 4/025; H04W 8/005; H04N 21/25841
USPC .............................................. 709/224; 379/45
See application file for complete search history.

(56) References Cited

U.S. PATENT DOCUMENTS

| | | | |
|---|---|---|---|
| 6,526,125 B1 * | 2/2003 | Lindsay et al. ................. 379/45 |
| 6,618,476 B1 * | 9/2003 | Szeto et al. .................... 379/198 |
| 6,665,611 B1 * | 12/2003 | Oran et al. ..................... 701/213 |
| 6,678,357 B2 * | 1/2004 | Stumer et al. .................... 379/45 |
| 7,769,037 B2 * | 8/2010 | Booth et al. .................... 370/419 |
| 7,796,738 B2 * | 9/2010 | Wright ............................. 379/45 |
| 7,937,067 B2 * | 5/2011 | Maier et al. ................. 455/404.1 |
| 7,974,388 B2 | 7/2011 | Sadot |
| 2005/0027837 A1 * | 2/2005 | Roese et al. ................... 709/223 |
| 2005/0063519 A1 * | 3/2005 | James ............................. 379/45 |
| 2006/0120517 A1 * | 6/2006 | Moon et al. ..................... 379/45 |
| 2006/0282529 A1 * | 12/2006 | Nordin .......................... 709/224 |
| 2007/0253429 A1 * | 11/2007 | James ....................... 370/395.42 |

(Continued)

FOREIGN PATENT DOCUMENTS

CN 1953404 4/2007

OTHER PUBLICATIONS

International Search Report and Written Opinion from PCT/US2008/080660, Mailed Jan. 23, 2009, 12 pgs.

(Continued)

*Primary Examiner* — Phuoc Nguyen
*Assistant Examiner* — Kishin G Belani
(74) *Attorney, Agent, or Firm* — Blakely, Sokoloff, Taylor & Zafman

(57) ABSTRACT

A method is provided for a network location service in which one or more packet forwarding devices in the network collect and maintain location data for the devices/users currently connected to a network. The data is maintained locally in each packet forwarding device and may be provided on demand to a network/business application, such as emergency 911 services or a location-based security or personalization system. The location data is provided in real-time or near real-time using an in-band channel communication and/or over the Internet using a standard transport protocol, such as HTTP/S and SOAP web services.

25 Claims, 7 Drawing Sheets

(56) References Cited

U.S. PATENT DOCUMENTS

2008/0126540 A1* 5/2008 Zeng et al. .................. 709/225
2009/0113043 A1* 4/2009 Suizo et al. .................. 709/224
2009/0187968 A1* 7/2009 Roese et al. .................... 726/1
2010/0332615 A1* 12/2010 Short et al. .................. 709/217

OTHER PUBLICATIONS

Telecommunications Industry Assoc., "ANSI/TIA-1057-2006: Link Layer Discovery Protocol for Media Endpoint Devices", Telecommunications, IP Telephony Infrastructure, TIA-1057 (Apr. 2006), 136 pgs.

PCT, International Preliminary Report on Patentability (Chapter I of the Patent Cooperation Treaty), Application No. PCT/US2008/080660, (May 4, 2010), Whole Document.

Communication pursuant to Article 94(3) EPC for European Patent Application 08844706.5 dated Dec. 14, 2010, 5 pages.

Communication pursuant to Article 94(3) EPC for European Patent Application 08844706.5 dated Dec. 15, 2011, 5 pages.

Non-Final Office Action for European Patent Application No. 08844706.5, Mailed Dec. 14, 2010, 5 pages.

Communication pursuant to Article 94(3) EPC for European Patent Application No. 08844706.5, Mailed May 11, 2011, 4 pages.

Non-Final Office Action for Chinese Patent Application No. 200880123530.8, dated Oct. 9, 2012, 12 pages.

Communication under Rule 71(3) EPC for Intention to Grant for European Patent Application No. 08844706.5, dated Dec. 20, 2012, 7 pages.

Non-Final Office Action for Japanese Patent Application No. 2010-532143, dated Feb. 5, 2013, 6 pages.

Non-Final Office Action for Chinese Patent Application No. 200880123530.8, dated Jul. 3, 2013, 19 pages.

Non-Final Office Action and Search Report for Chinese Patent Application No. 200880123530.8, dated Dec. 3, 2013, 14 pages.

Notice of Allowance for Japanese Patent Application No. 2010-532143, mailed Feb. 5, 2014, 3 pages.

Final Office Action for Chinese Patent Application No. 200880123530.8, mailed Oct. 8, 2014, 29 pages.

Fourth Office Action for Chinese Patent Application No. 200880123530.8, mailed May 5, 2014, 26 pages.

Non-Final Office Action for Japan Patent Application No. 2014-058571, mailed Feb. 10, 2015, 7 pgs.

* cited by examiner

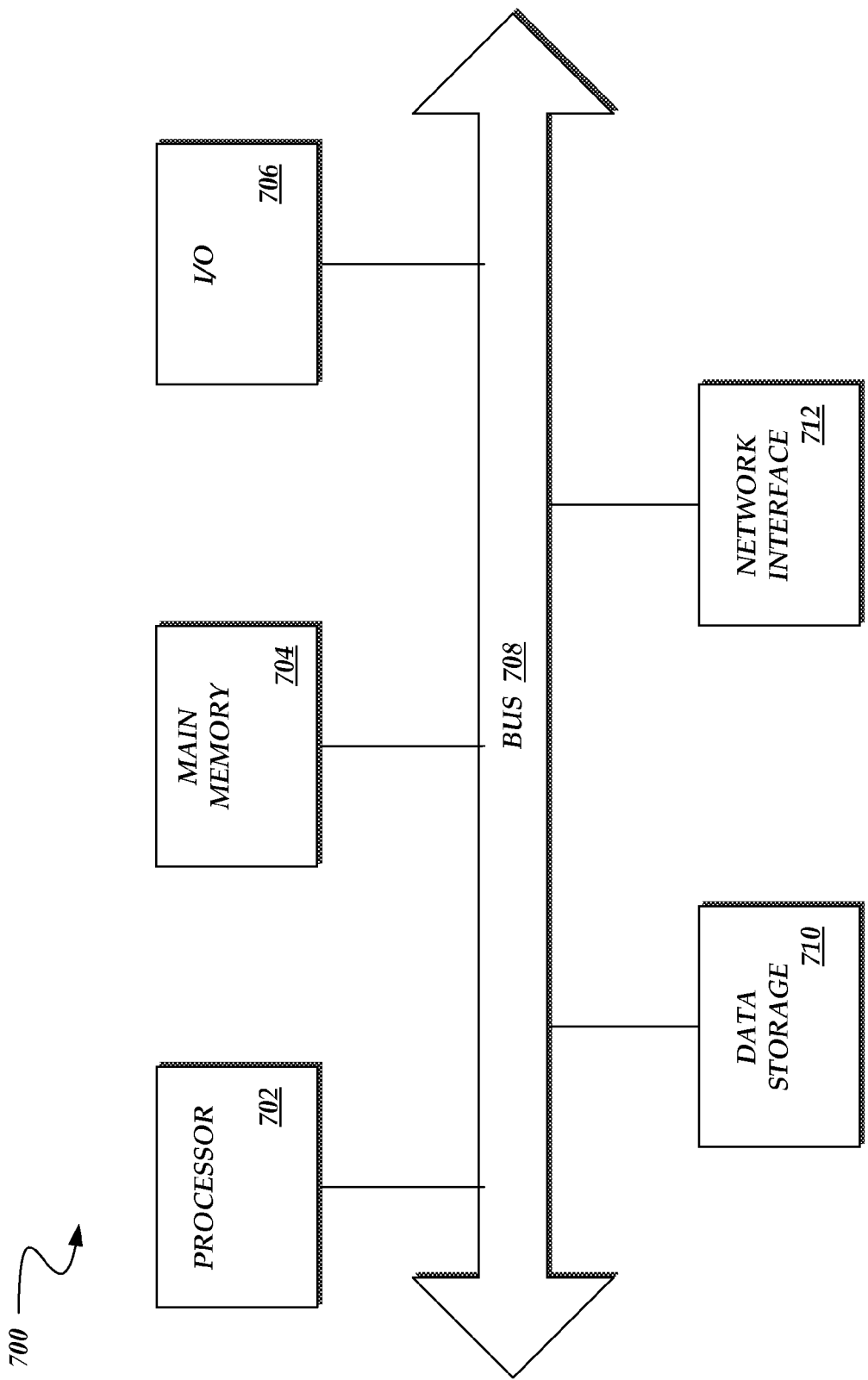

NETWORK LOCATION SERVICE

TECHNICAL FIELD

The present invention relates to the field of computer networks and internetworking communications technologies. In particular, the present invention relates to locating devices connected to a network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2007, Extreme Networks, Inc., All Rights Reserved.

BACKGROUND AND RELATED ART

Increasingly, enterprises offer their users mobility and accessibility to the enterprise's network and applications from anywhere and at anytime. As a result, one of the biggest challenges in administering today's enterprise network is to provide visibility and maintain control of who is connected to the network, where they are located, and which applications they use.

The user and endpoint device information necessary for providing visibility and maintaining control, such as the user's physical location, the endpoint device's Internet Protocol (IP) and Media Access Control addresses, the Virtual Local Area Network (VLAN) to which the user/device belongs, and any related Quality of Service (QoS) information, can be difficult to obtain. Unless the information is captured when the user/endpoint device initially connects to the network, the information must generally be retrieved from the network itself, such as from the network connectivity devices, i.e., the switches, through which the user is connected to the network.

Most of the existing technology for obtaining the user and endpoint device information necessary for providing visibility and maintaining control of the network do not scale well. This is particularly true in large network deployments or in networks where the user/endpoint device connections and access to applications tend to be dynamic.

For example, some of the solutions available today use a "pull" model to obtain information about the endpoint devices and users connected to the network by intermittently polling the network connectivity devices, switch by switch, and interrogating the local forwarding databases (FDBs). As a practical matter, however, calling the devices, switch by switch, and extracting and sending the information back to a centralized repository, such as a network management system (NMS) database, may consume a significant amount of network bandwidth and time. The information is likely to be stale by the time it reaches the NMS. Moreover, not all of the desired information may be extracted from or even derived from information stored in the FDB.

Other solutions make use of the Link Layer Discovery Protocol (LLDP), in which LLDP-enabled devices advertise information about themselves over the Data Link layer that allows devices to learn higher layer management reachability and connection endpoint information from adjacent devices. But not all devices may be LLDP-enabled. Moreover, the LLDP information must still be extracted from the devices and centrally stored.

Still other solutions make use of proprietary discovery protocols to discover and store information in an enterprise extension of the Management Information Base (MIB) used with the Simple Network Management Protocol (SNMP). But not all devices in a network may work with the proprietary discovery protocols.

SUMMARY

According to one aspect of the invention, a method and system is provided for location and identification of devices/users connected to a network. A network location service is provided in which packet forwarding devices collect and maintain device/user location data, and provide the data to requesters in real-time. A packet forwarding device, such as a switch, router, or hub, or the like, is provided with a network location service agent and a repository for storing network location data for devices/users connected to the network.

According to one aspect of the invention, the agent associates devices with their location when devices/users are connected to the network. The agent may detect the presence of a device/user connected to the network using network protocols such as LLDP, .1X Snooping, NetLogin, ARP/DHCP and or the MAC address and FDB entries associated with the device/user connection.

According to one aspect of the invention, the agent stores data indicating the location locally on the packet forwarding device for the duration of the connection. The agent may further store other data representing one or more attributes associated with the device/user connection, such as attributes obtained during detection of the presence of the device/user connected to the network using the network protocols such as LLDP, .1X Snooping, NetLogin, ARP/DHCP and or the MAC address and FDB entries associated with the device/user connection.

According to one aspect of the invention, the agent further responds to requests for location data for a particular Internet Protocol/Media Access Control (IP/MAC) identifiers, including forwarding requests to other packet forwarding devices in the network when a request cannot be satisfied, i.e., when location data for the particular IP/MAC is not available, including when the particular IP/MAC is not connected to the network or is not connected to the network via that packet forwarding device.

According to one aspect of the invention, the agent communicates with requesters of location data and other switches using one or more of an in-band channel or via a communications protocol such as the Hypertext Transfer Protocol/S, or HTTP/S. The communications between the agents and requesters may be relayed using protocols such as the SOAP Web Services protocol.

According to one aspect of the invention, the requesters of location data may include a network or business application having access to the network. The requesters may be provided with a network location service client to facilitate issuing requests for location data and receiving responses.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF DRAWINGS

The present invention will be described by way of exemplary embodiments, but not limitations, illustrated in the accompanying drawings in which like references denote similar elements, and in which:

FIG. 7 illustrates one embodiment of a suitable computing environment in which certain aspects of the invention illustrated in FIGS. 1-6 may be practiced.

DETAILED DESCRIPTION OF THE INVENTION

In the following description various aspects of the present invention, a method and apparatus for a network location service, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system or a packet-forwarding device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
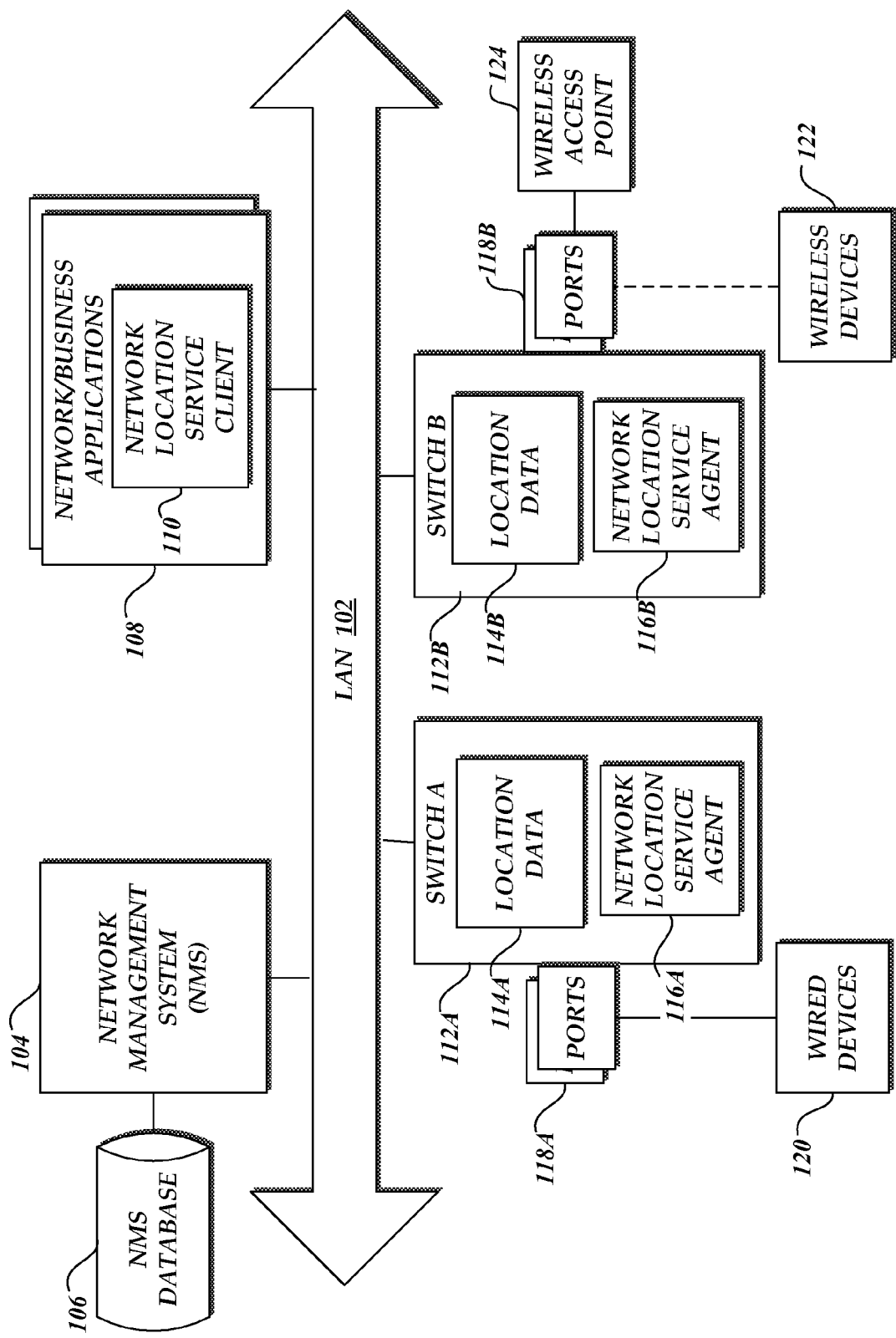
FIG. 1 is a block diagram illustrating certain aspects of a network location service in accordance with an embodiment of the invention.

FIG. 1 is a block diagram illustrating a simplified overview of a local area network (LAN) 102 within which a network location service may be implemented in accordance with an embodiment of the present invention. The LAN 102 is a packet switched network that is supported by packet forwarding devices, switch A 112A and switch B 112B, each having a number of ports 118A/B. In one embodiment of the network location service, the switches A/B 112A/B are equipped with local repositories for storing location data 114A/B, as well as their own network location service agents 116A/B. The network location agents 116A/B are components of the switch that may be implemented in software or hardware or both.

In one embodiment, the ports 118A/B on the respective switches 112A/B are connected to any device capable of being connected to a network, including a wired device 120 as well as a wireless device 122 via a wireless access controller 124. The connected devices 120/122 may range from personal computers, printers and other peripheral devices, and may include but are not limited to desktop and wireless computers, personal digital assistants and other mobile devices, such as Voice over Internet Protocol (VoIP) enabled telephones and other types of soft phones supporting voice communication over a packet switched network.

In a typical embodiment, the LAN 102 is managed by a network management system (NMS) 104. The NMS 104 typically operates in conjunction with a policy/configuration NMS database 106, and has numerous features to facilitate managing the network 102, including features for configuring the ports 118A/B on the switches A/B 112A/B. In a typical embodiment, the NMS 104 facilitates the assignment of a physical location for the ports 118A/B on the switches A/B 112A/B.

In one embodiment, the LAN 102 may provide network location services to a network/business application 108, such as a location-based security application, an emergency 911 system, a presence/VoIP system, and asset/inventory management system, and/or a location-based personalization system. These are just some examples of applications with which a network location service may be employed in accordance with an embodiment of the present invention.

Figure 2:
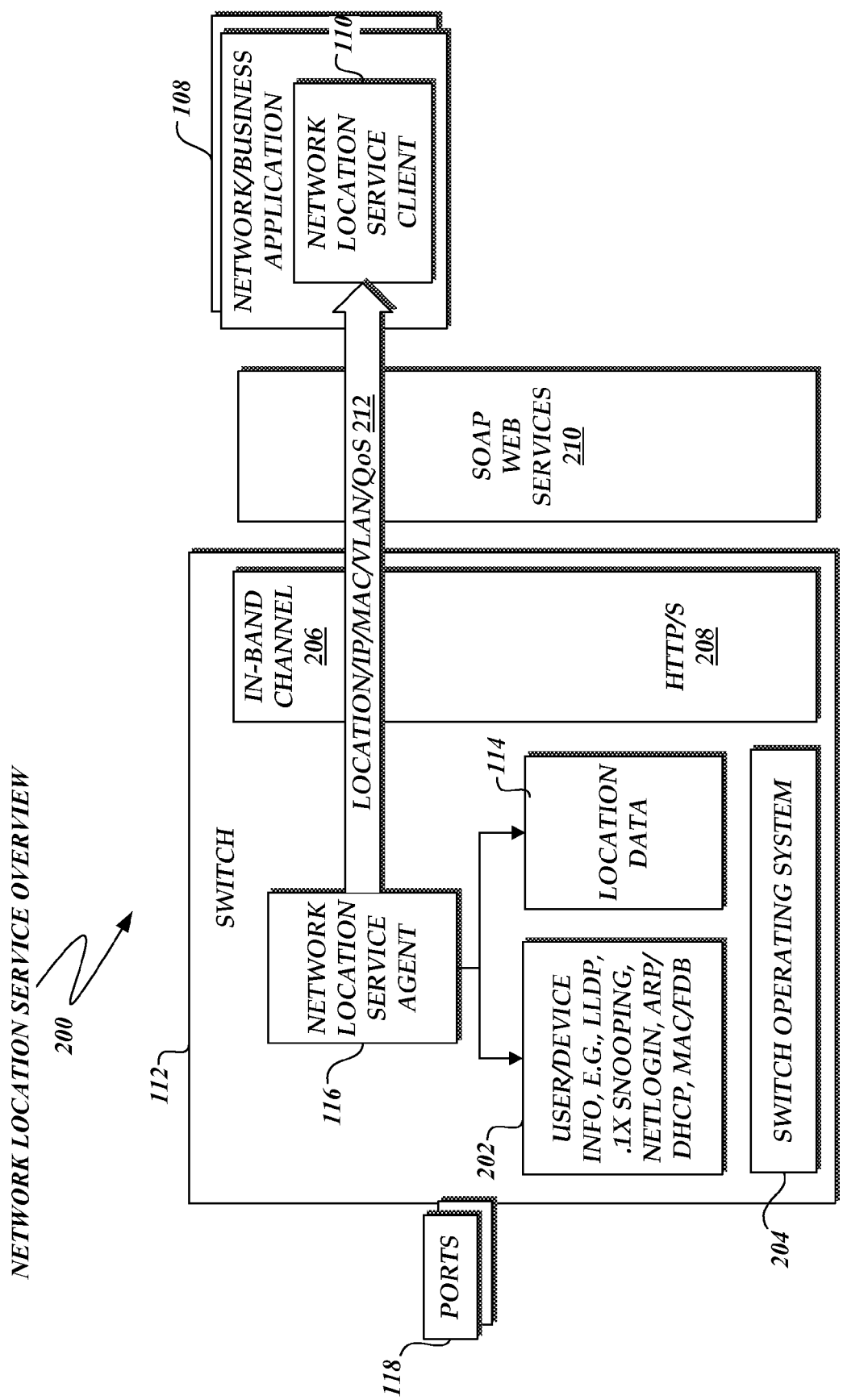
FIG. 2 is a block diagram illustrating in further detail certain aspects of a network location service in accordance with an embodiment of the invention.

FIG. 2 is a block diagram illustrating a packet forwarding device such as the switches 112A/B in FIG. 1 (referred to hereafter as a switch for ease of reference) incorporated into a network location service 200 in accordance with an embodiment of the invention. A network location service agent 116 detects the presence of a device/user connecting to the network via one of the ports 118. Upon detection, using the internal services of the switch's operating system 204, the switch 112 captures user/device information 202 from the various protocols used to initiate the connection and/or from the information stored in the forwarding data base (FDB) as a result of the connection. The user/device information 202 may include, but is not limited to attributes that identify the IP/MAC, VLAN, and QoS associated with the user/device. This user/device info 202 may be stored along with the physical location data 114 that has previously been configured for the port 118 through which the device connected to the switch 112. For example, the NMS 104 may have previously configured the physical location for the port 118. In this manner, the network location service agent 116 associates the physical location of the port through which the user/device established the connection with the user/device info 202.

In one embodiment, the agent 116 sends 212 the location data, along with other data, such as the IP/MAC/VLAN/QoS data gleaned upon detection of the presence of the device connecting to the network, to any one or more network business applications 108 that may have requested the information. In one embodiment, the request is issued on demand, or in some cases by subscription, to receive location data now or when it becomes available. In a typical embodiment, the network/business application 108 may incorporate a network location service client 110 to facilitate requesting and receiving the location data.

In one embodiment, the agent 116 sends 212 the location data and other user/device info in a packet directed to the address of the network/business application on the network using an in-band channel 206. Alternatively, or in addition, the agent 116 may utilize the HTTP/S protocol and SOAP web services 210 to send the location and other data to the network/business application out-of-band via the Internet.

Figure 3:
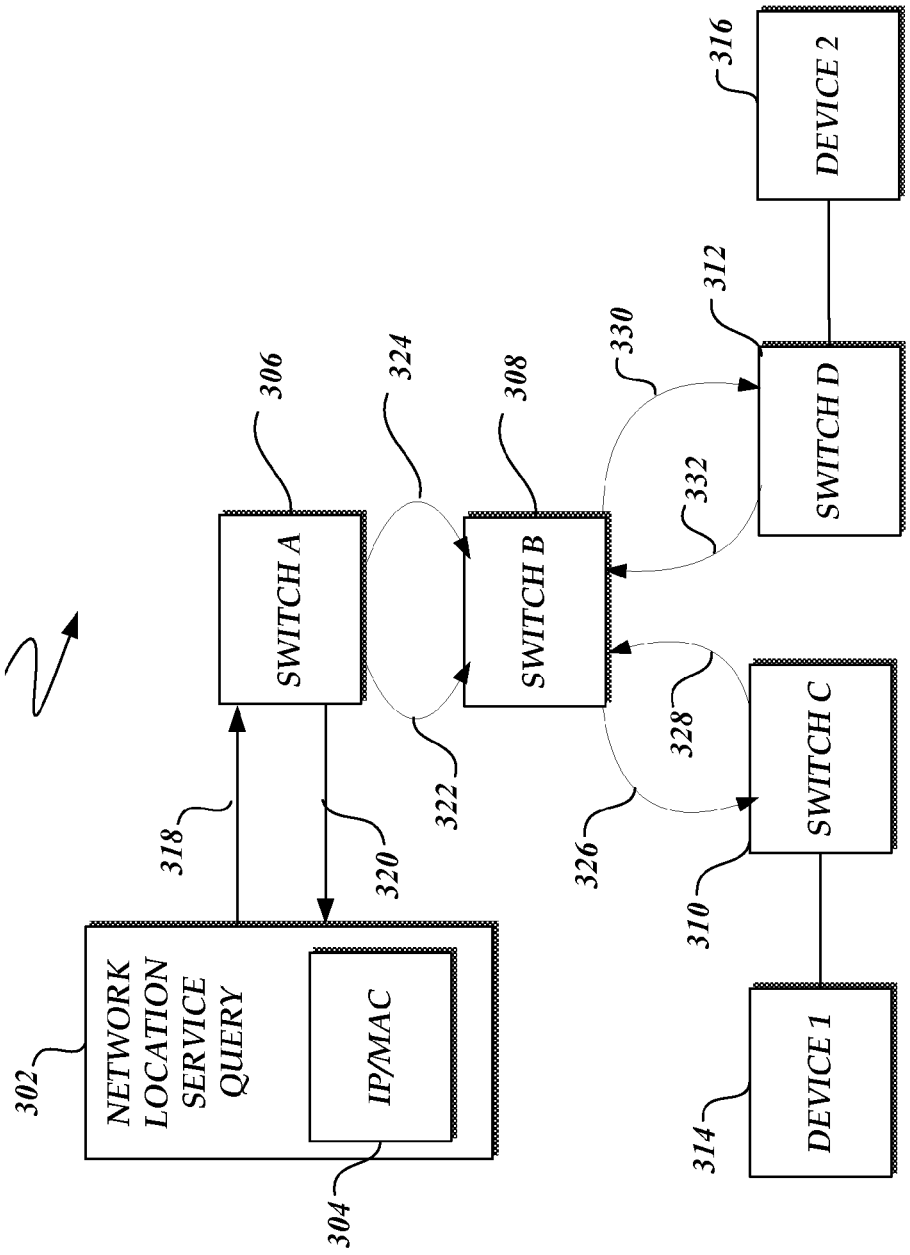
FIG. 3 is a block diagram illustrating aspects of an in-band channel used in the network location service in accordance with an embodiment of the invention.

FIG. 3 is a simplified example of a network location system's in-band channel communication. As shown, a network location service query 302 for a particular IP/MAC identifier 304 is issued 318 over the in-band channel to switch A 306. Upon receiving the query 302, the switch 306 interrogates its own local repository of location data to determine whether the particular IP/MAC identifier is present. If so, the switch 306 can issue a response 320 over the in-band channel back to the requester. If not, the switch 306 can forward 322 the query 302 to the next switch b 308. Switch B 308 interrogates its own local repository in the same manner as switch A 306, and similarly issues a response 324 or forwards 326/330 the query 302 to neighboring switches C and D 310/312, which in turn issue responses 328/332 or forward the query and so on, until the particular IP/MAC identifier has been located (or until the list of switches is exhausted). In this manner, the network location system can use the in-band channel communication to respond in real-time or near real-time to requests for the location of a particular IP/MAC identifier.

Figure 4:
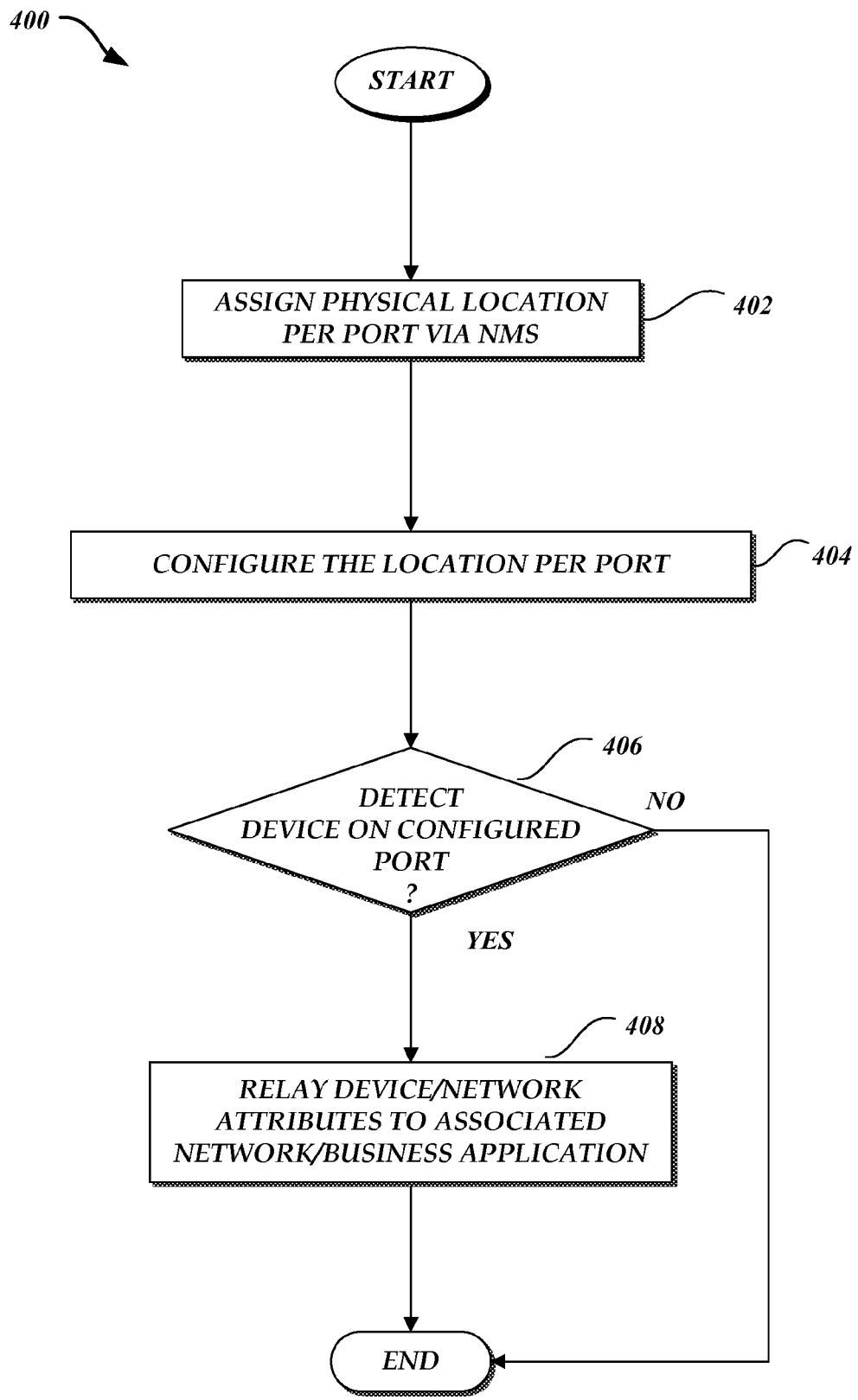
FIGS. 4-6 are flow diagrams illustrating certain aspects of methods to be performed in a network location service implemented in accordance with one embodiment of the invention.
Figure 5:
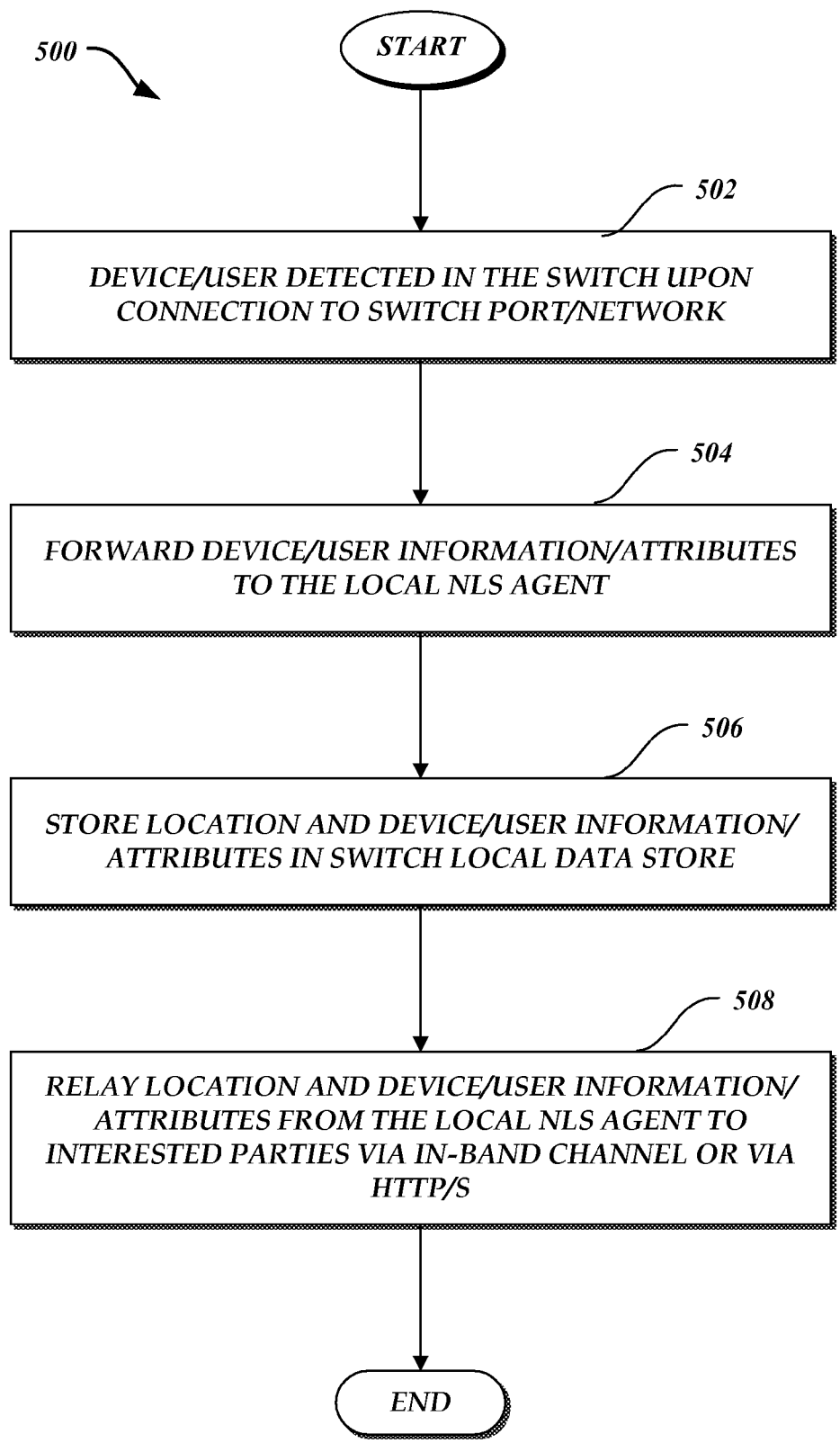
Figure 6:
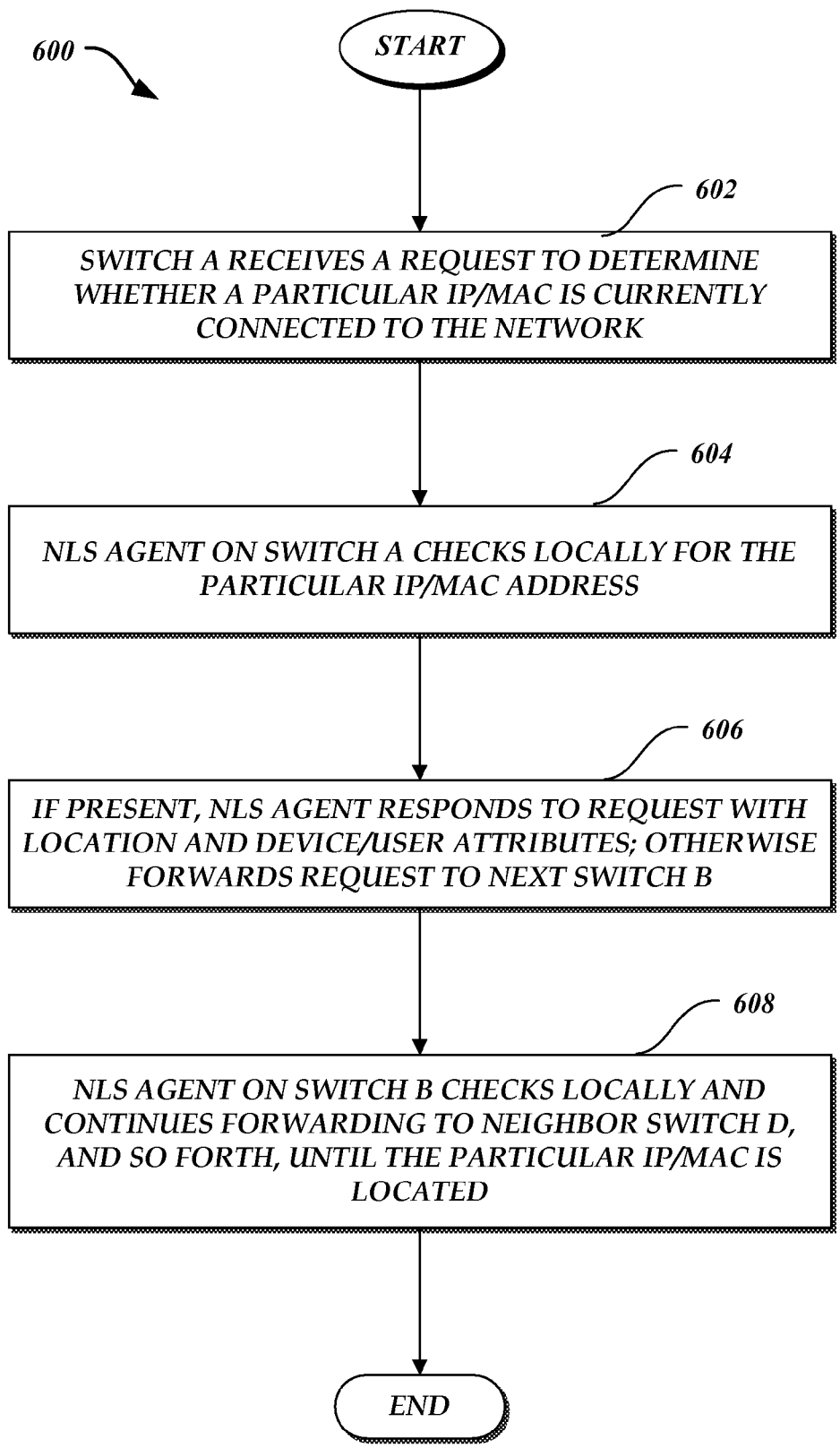

FIGS. 4-6 are flow diagrams illustrating certain aspects of methods to be performed in a network location service implemented in accordance with one embodiment of the invention. In FIG. 4, at process block 402, the method 400 begins by assigning a physical location per port for each packet forwarding device in a LAN for which network location services are desired. In a typical embodiment, the assignment may be carried out using a network management system. At process block 404, the method 400 continues by configuring the location per port on the packet forwarding device. Once configured, the method 400 continues at decision block 406 to detect whether a user/device is attempting to connect to the network, or has connected to the network, via one of the configured ports. If so, the method 400 continues at process block 408 to relay the device/network attributes to one or more network business applications that have requested such information.

Turning to FIG. 5, at process block 502, a method 500 begins when a device/user is detected in a network location service enabled switch upon connection to the network via the switch's port. At process block 504, the method 500 forwards the device/user information/attributes captured during the connection to the local network location service agent residing on the switch. At process block 506, the method 500 continues when the agent stores the location and device/user information/attributes in the switch's local data store. In this manner, the agent associates the physical location through which the user/device connected to the network with the other user/device information identifying the user/device, thereby creating a distributed physical location data repository of the users/devices connected to the network. At process block 508, the method 500 concludes by relaying the location and device/user information/attributes from the local network location service agent to one or more interested parties, i.e., the network/business applications. In one embodiment, the information may be relayed in a packet over the packet switched network via an in-band channel. Alternatively, or in addition, the information may be related via a protocol such as the HTTP/S protocol, using SOAP web services.

Turning now to FIG. 6, at process block 602, a method 600 begins when a switch receives a request to determine whether a particular IP/MAC is currently connected to the network, and if so, from which location in the network. At process block 604, the method 600 continues when the NLS agent on the switch receiving the request checks locally for the particular IP/MAC identifier. If present, the method 600 continues at process block 606 when the network location service agent response to the request with the location and device/user attributes, if any. Otherwise, the network location service agent forwards the request to one or more other switches in the network to fulfill the request. At process block 608, the method 600 concludes when the network location service agent on the other switches in the network checks locally for the presence of the IP/MAC identifier and continues forwarding the request to neighboring switches until the particular IP/MAC is located and/or the switches are exhausted. In the latter case the switches may respond with a not found indication for the particular IP/MAC.

FIG. 7 illustrates one embodiment of a suitable computing environment in which certain aspects of the invention illustrated in FIGS. 1-6 may be practiced. In one embodiment, the method for a network location service 200 may be implemented on a computer system 700 having components 701-706, including a processor 701, a memory 702, an Input/Output device 703, a data storage 704, and a network interface 705, coupled to each other via a bus 708. The components perform their conventional functions known in the art and provide the means for implementing the network location service 200. Collectively, these components represent a broad category of hardware systems, including but not limited to general purpose computer systems and specialized packet-forwarding devices.

In one embodiment, the memory component 702, may include one or more of random access memory (RAM), and nonvolatile storage devices (e.g., magnetic or optical disks) on which are stored instructions and data for use by processor 701, including the instructions and data that comprise the switch fabric and switch fabric components, as well as the network location service agent 116, user/device information 202, and location data 114 and other components of the network location service 200.

In one embodiment, the network interface component 705 may include the ports 118, as well as any logical groupings of ports into load shared groups. The data storage component 704 may also represent the user/device information 202 and location data 114 obtained by the network location service agent 116, as well as any routing or bridging tables in the switch fabric, and any other storage areas such as packet buffers, etc., used by the packet-forwarding device 112 and switch fabric for forwarding network packets or messages.

It is to be appreciated that various components of computer system 700 may be rearranged, and that certain implementations of the present invention may not require nor include all of the above components. Furthermore, additional components may be included in system 700, such as additional processors (e.g., a digital signal processor), storage devices, memories, network/communication interfaces, etc.

In the illustrated embodiment of FIG. 7, the method and apparatus for a network location service in accordance with one embodiment of the invention as discussed above may be implemented as a series of software routines executed by computer system 700. The software routines may comprise a plurality or series of instructions, code sequences, configuration information, or other data to be accessed and/or executed by a processing system such as one or more of processor 701. Initially, the series of instructions, code sequences, configuration information, or other data may be stored on a data storage medium 704 and transferred to memory 702 via bus 708. It is to be appreciated that the series of instructions, code sequences, configuration information, or other data can be stored a data storage medium 704 using any conventional non-transitory computer-readable or machine-accessible storage medium, such as a diskette, CD-ROM, magnetic tape, DVD, ROM, or mass storage hardware device. It is also to be appreciated that the series of instructions, code sequences, configuration information, or other data need not be stored locally, and could be carried on a communication storage medium as a propagated data signal received from a remote storage device, such as a server on a network, via a network/ communication interface 705. The instructions, code sequences, configuration information, or other data may be copied from the data storage medium 704, such as the mass storage hardware device, or from the propagated data signal carried on the communication storage medium, into a memory 702 and accessed and executed by processor 701.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a network location service. From the foregoing description, those skilled in the art will recognize that many other variations of the present invention are possible. In particular, while the present invention has been described as being implemented in a network comprising one or more packet-forwarding devices 112 in a LAN 102 for a packet switched network, some of the logic may be distributed in other components of a network or internetwork application. Thus, the present invention is not limited by the details described. Instead, the present invention can be practiced with modifications and alterations within the spirit and scope of the appended claims.

What is claimed is:

1. A computer-implemented method for a network location service comprising performing on a hardware processor:
   receiving a current physical location to assign to a port on a packet forwarding device in a network in accordance with a network management system policy database;
   configuring the port on the packet forwarding device with the assigned current physical location;
   detecting a connection of an end user device to the port on the packet forwarding device in the network, the end user device having a unique identifier, the connection being initiated in accordance with a communication protocol implemented on the packet forwarding device;
   associating the configured assigned current physical location of the port on the packet forwarding device directly with the connected end user device when establishing the connection of the connected end user device to the port on the packet forwarding device, wherein associating enables the configured assigned current physical location of the port on the packet forwarding device to be dynamically accessible by the unique identifier of the connected end user device;
   storing, for the duration of the connection, the associated configured assigned current physical location, the unique identifier and information about the connected end user device in a repository on the same packet forwarding device on which the port resides, wherein the associated configured assigned current physical location and information about the connected end user device are directly accessible by the unique identifier;
   receiving, over an in-band channel communication between a plurality of packet forwarding devices in the network, requests for a physical location of an end user device connected to the network, the requests specifying the unique identifier of the end user device; and
   relaying, from one of the plurality of packet forwarding devices in the network, over the in-band channel communication, the stored associated configured assigned current physical location and information about the connected end user device to an application on the network by the unique identifier, the application dynamically locating connected end user devices by their respective unique identifiers.

2. The computer-implemented method of claim 1, further comprising:
   capturing attributes of the connected end user device when establishing the connection of the connected end user device to the port on the packet forwarding device;
   storing for the duration of the connection the captured attributes in the repository on the packet forwarding device, the captured attributes comprising the information about the connected end user device; and
   relaying the stored captured attributes of the connected end user device to the application on the network by the unique identifier.

3. The computer-implemented method of claim 1, wherein detecting the connection of the connected end user device to the port on the packet forwarding device is performed in accordance with the communication protocol implemented on the packet forwarding device.

4. The computer-implemented method of claim 3, wherein the communication protocol is at least one of a Link Layer Data Protocol, a .1x snooping protocol, a network login protocol, an address resolution protocol, and a dynamic host control protocol.

5. The computer-implemented method of claim 1, wherein relaying to the application on the network by the unique identifier the stored associated location and information about the connected end user device is performed over the Internet using a standard transport protocol.

6. The computer-implemented method of claim 1, wherein performing on the hardware processor is further comprising:
   receiving in the packet forwarding device a request for a physical location of a device connected to the network, the request specifying a unique identifier of the device;
   determining that the unique identifier of the device specified in the request matches the unique identifier of the connected end user device that is connected to one of the ports on the one of the packet forwarding devices among the plurality of packet forwarding devices; and
   relaying, in response to the request, the stored associated location and information about the connected end user device from the determined one of the packet forwarding devices to the application by the unique identifier.

7. The computer-implemented method of claim 6, wherein performing on the hardware processor is further comprising:
   determining that the unique identifier of the device specified in the request does not match any of the unique identifiers of end user devices connected to ports on one of the plurality of packet forwarding devices; and
   relaying the request for the physical location of the device connected to the network to another one of the plurality of packet forwarding devices in the network to whose ports the device having the unique identifier specified in the request may be connected.

8. The computer-implemented method of claim 1, wherein the unique identifier is an Internet Protocol address or Media Access Control address.

9. A system for a locating end user devices connected to a network, the system comprising:
   a packet forwarding device in a network having a plurality of packet forward devices, the packet forwarding device having a processor for locating devices connected to the network through ports on the packet forwarding device, wherein the processor:
   receives a current physical location to assign to a port on the packet forwarding device in accordance with a network management system policy database communicatively coupled to the network of the packet forwarding device;
   configures the assigned current physical location of the port on the packet forwarding device;
   detects a connection of an end user device to the port on the packet forwarding device, the end user device having a unique identifier, the connection being initiated in accordance with a communication protocol implemented on the packet forwarding device;
   associates the configured assigned current physical location of the port on the packet forwarding device directly with the connected end user device when establishing the connection of the connected end user device to the port on the packet forwarding device, wherein to associate enables the configured assigned current physical location of the port on the packet forwarding device to be dynamically accessible by the unique identifier of the connected end user device;
   stores, for the duration of the connection, the associated configured assigned current physical location, the unique identifier and information about the connected end user device in a repository on the same packet forwarding device on which the port resides, wherein the associated configured assigned current physical location and information about the connected end user device are directly accessible by the unique identifier;
   receives in one of the plurality of packet forwarding devices over an in-band channel communication between the plurality of packet forwarding devices in the network, a request to locate the connected end user device in the network, the request specifying the unique identifier of the connected end user device; and
   relays, from the receiving one of the plurality of packet forwarding devices in the network, over the in-band channel communication, the stored associated configured assigned current physical location and information about the connected end user device to an application on the network by the unique identifier responsive to receiving the request, the application dynamically locating connected end user devices by their respective unique identifiers.

10. The system of claim 9, wherein the processor further:
    captures attributes of the connected end user device responsive to initiation of the connection of the connected end user device to the port on the packet forwarding device;
    stores for the duration of the connection the captured attributes in the repository on the packet forwarding device, the captured attributes comprising the information about the connected end user device; and
    relays the stored captured attributes of the connected end user device to the application on the network by the unique identifier responsive to receiving the request.

11. The system of claim 9, wherein the processor detects the connection of the connected end user device to the port on the packet forwarding device in accordance with the communication protocol implemented on the packet forwarding device.

12. The system of claim 11, wherein the communication protocol is at least one of a Link Layer Data Protocol, a .1x snooping protocol, a network login protocol, an address resolution protocol, and a dynamic host control protocol.

13. The system of claim 9, wherein the processor of the packet forwarding device relays the stored associated location and information about the connected end user device to the application on the network by the unique identifier over the Internet using a standard transport protocol.

14. The system of claim 9, wherein the processor of the packet forwarding device further:
    determines that the unique identifier of the device specified in the request does not match any of the unique identifiers of end user devices connected to ports on the receiving one of the plurality of packet forwarding devices; and
    relays, over the in-band channel communication, the request to locate the connected end user device to another one of the plurality of packet forwarding devices in the network.

15. The system of claim 9, wherein the unique identifier is an Internet Protocol address or Media Access Control address.

16. The system of claim 9, wherein the processor of the packet forwarding device further:
    determines that the unique identifier of the device specified in the request matches the unique identifier of the connected end user device that is connected to one of the ports on the receiving one of the plurality packet forwarding devices; and
    relays, over the in-band channel communication, the stored associated location and information about the connected end user device from the receiving one of the plurality of packet forwarding devices to the application by the unique identifier.

17. An article of manufacture comprising:
   a non-transitory computer-readable medium including instructions that, when executed on a computer processor, cause the processor to:
   receive a current physical location to assign to a port on a packet forwarding device in accordance with a network management policy database;
   configure the assigned current physical location of the port on the packet forwarding device, detect a connection of an end user device to the port on the packet forwarding device in a network, the end user device having a unique identifier, the connection being initiated in accordance with a communication protocol implemented on the packet forwarding device;
   associate the configured assigned current physical location of the port with the connected end user device to enable the configured assigned current physical location of the port on the packet forwarding device to be dynamically accessible by the unique identifier of the connected end user device;
   store, for the duration of the connection, the associated configured assigned current physical location, the unique identifier and information about the connected end user device in a repository on the same packet forwarding device, wherein the associated configured assigned current physical location and information about the connected end user device are directly accessible by the unique identifier;

receiving, over an in-band channel communication between a plurality of packet forwarding devices in the network, requests for a physical location of an end user device connected to the network, the requests specifying the unique identifier of the end user device; and relay, from one of the plurality of packet forwarding devices in the network, the stored associated configured assigned current physical location and information about the connected end user device to an application on the network by the unique identifier, the application dynamically locating connected end user devices by their respective unique identifiers.

18. The article of manufacture of claim 17, wherein the instructions further cause the processor to:

capture attributes of the connected end user device when establishing the connection of the connected end user device to the port on the packet forwarding device;

store for the duration of the connection the captured attributes in the repository on the packet forwarding device, the captured attributes comprising the information about the connected end user device; and relay the stored captured attributes of the connected end user device to the application on the network by the unique identifier.

19. The article of manufacture of claim 17, wherein the instructions further cause the processor to:

detect the connection of the connected end user device to the port on the packet forwarding device in accordance with the communication protocol implemented on the packet forwarding device.

20. The article of manufacture of claim 19, wherein the communication protocol is at least one of a Link Layer Data Protocol, a .1x snooping protocol, a network login protocol, an address resolution protocol, and a dynamic host control protocol.

21. The article of manufacture of claim 17, wherein the instructions further cause the processor to relay the stored associated location and information about the connected end user device to an application on the network by the unique identifier, using an in-band communication channel communicatively coupled to the packet forwarding device.

22. The article of manufacture of claim 17, wherein the instructions further cause the processor to relay the stored associated location and information about the connected end user device to an application on the network by the unique identifier and over the Internet using a standard transport protocol.

23. The article of manufacture of claim 17, wherein the instructions further cause the processor to:

receive, in the packet forwarding device, a request for a physical location of a device connected to the network, the request specifying a unique identifier of the device;

determine that the unique identifier of the device specified in the request matches the unique identifier of the connected end user device connected to one of the ports on the one of the packet forwarding devices among the plurality of packet forwarding devices; and relay, in response to the request, the stored associated location and information about the connected end user device from the determined one of the packet forwarding devices to the application by the unique identifier.

24. The article of manufacture of claim 17, wherein the instructions further cause the processor to:

determine that the unique identifier of the device specified in the request does not match any of the unique identifiers of end user devices connected to ports on one of the plurality of packet forwarding devices; and relay the request for the physical location of the device connected to the network to another one of the plurality of packet forwarding devices in the network to whose ports the device having the unique identifier specified in the request may be connected.

25. The article of manufacture of claim 17 wherein the unique identifier is an Internet Protocol address or Media Access Control address.

* * * * *